Feb. 10, 1931.  H. OMENITSCH  1,791,935
TIRE CASING CUSHION
Filed Nov. 2, 1929
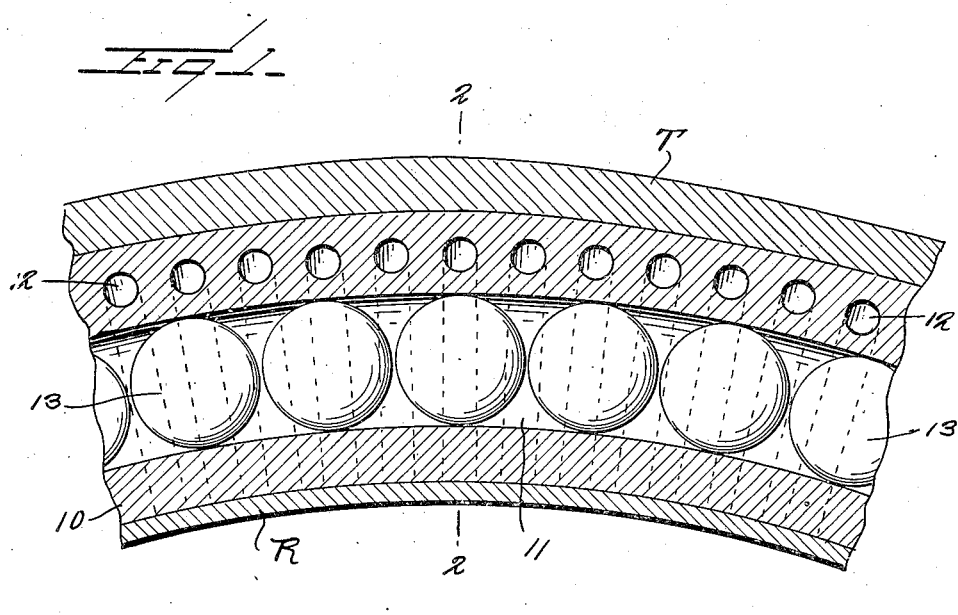
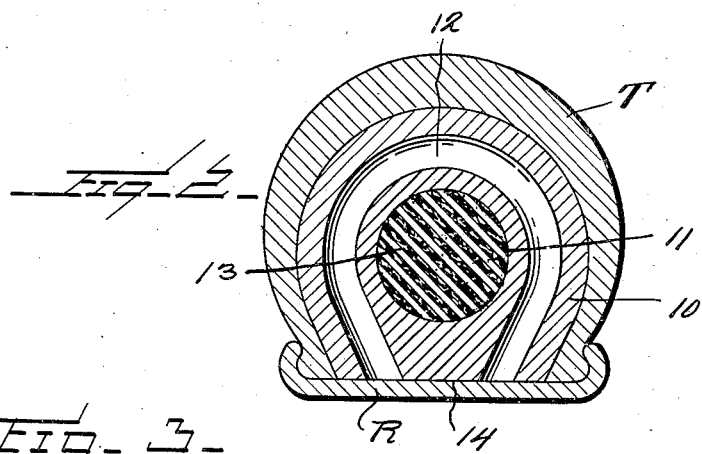
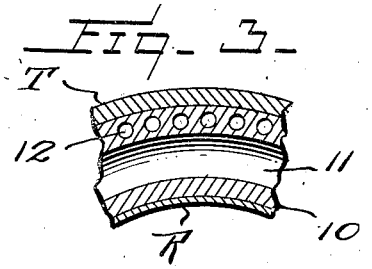
Inventor
H. Omenitsch
By Watson E. Coleman
Attorney Patented Feb. 10, 1931

1,791,935

UNITED STATES PATENT OFFICE

HANS OMENITSCH, OF JACKSON HEIGHTS, NEW YORK, ASSIGNOR OF ONE-THIRD TO ARTHUR BAUMANN, OF ELMHURST, LONG ISLAND, NEW YORK, AND ONE-THIRD TO HERBERT HOLDEN, OF NEW YORK, N. Y.

TIRE-CASING CUSHION

Application filed November 2, 1929. Serial No. 404,401.

The present invention relates to vehicle tires and more particularly to means for maintaining the casing or tire in substantially undistorted condition.

An object of this invention is to provide a device of this character which may be readily inserted in a tire casing and which is provided with cushioning means for maintaining the tire casing in substantially undistorted condition.

Another object of this invention is to provide an insertable ring which may be mounted within a tire casing which will not be affected by nails, glass or the like, so that the casing will at all times be maintained in substantially undistorted condition.

A still further object of this invention is to provide a cushioning element insertable in a tire casing which is not subject to punctures or the like, and which may be removed from the casing when the latter has worn out and reinserted in another casing.

A further object of this invention is to provide a device of this character which will eliminate the present pneumatic tubes which are mounted in tire casings and which are subject to punctures or the like.

The above and various other objects and advantages of this invention will in part be described in and in part understood from the following detailed description of the present preferred embodiment, the same being illustrated in the accompanying drawing wherein:—

Fig. 1 is a fragmentary longitudinal section of a device constructed according to the present invention;

Fig. 2 is a transverse section partly in elevation, taken substantially on the lines 2—2 of Fig. 1.

Fig. 3 is a fragmentary sectional view showing a modification of this device.

Referring to the drawing wherein like numerals designate corresponding parts throughout the drawing, the letter R designates a rim of the conventional type which may be mounted on a wheel or the like and which is adapted to engage a tire casing T or the like which may be of any conventional type.

A cushioning element, generally designated as 10, is adapted to be removably mounted within the tire casing T and is substantially semi-circular in cross section so as to substantially occupy the opening or cavity within the inner walls of the tire casing. The cushion 10 is provided with a substantially circular opening 11 which is spaced inwardly from the outer surface thereof. The cushion 10 may be constructed of any suitable material but preferably of rubber or other resilient or yieldable material. Due to the fact that the cushion is not subjected to wear it may be constructed of waste rubber or the like.

The cushion 10 is provided with a plurality of arched openings 12 which are preferably provided at spaced intervals about the cushion and are adapted to have their openings extending inwardly toward the rim R.

The openings 12 are substantially tubular in shape and preferably extend about the tubular opening 11, extending inwardly from the outer surface of the cushion 10, and may be of various sizes depending on the weight to be supported.

Through the provision of the tubular or arched openings 12, it is possible to so regulate the resiliency of the cushion that it will readily support the desired weight, this being accomplished by increasing or decreasing the number of openings 12 so as to correspondingly change the flexibility of the cushion. A plurality of balls or spheres 13 are loosely mounted within the tubular opening 11. The balls 13 are preferably constructed of rubber or the like and in the present instance, the balls 13 may be constructed of sponge rubber or the like so as to assist or strengthen the body structure and at the same time provide resilient cushion for the tire T when the tire engages an obstruction or rock projection above the surface of the ground, or the like, over which the tire is moved. It will be understood, however, that the cushion 10 will support the tire T without the use of the balls 13.

It will be noted from the foregoing that a substantially aerated cushioning element is provided which will support the tire and at the same time is not capable of being injured by nails or the like.

In the tire casings at present in use, an inflated tube is positioned within the casing and is subject at all times to being punctured or injured by foreign elements, whereas in the present instance, a substantially firm, resilient element has been provided which may be inserted in any tire casing at present in use, but the use of the cushioning element will not subject the tire to undue pressure from within and the tire or tire casing may be worn on the wheel until it is substantially worn out; whereas in the casings at present in use, the life of the casing has been limited to the point where it will not withstand the pressure of the air in the inner tube in addition to the weight of the vehicle.

The use of a cushioning element of this type will therefore increase the life of the tire casing, eliminate the use of a spare or fifth tire, and when the outer casing has been substantially worn out, the cushion may be reinserted in a new casing.

The inner surface 14 of the cushioning element 10 is preferably flat so as to conform to the configuration of the rim, and the openings 12 are adapted to extend upwardly from the flattened surface 14.

In use, the cushion 10 may be inserted in the casing T before mounting the casing on the rim R and the casing may then be mounted on the rim in the usual manner. The rim R may be of either the clincher or the straight side type.

When the tire T moves forward on the ground, the cushion 10 will yieldably cushion the tire and prevent collapsing of the tire. Due to the light construction of the cushion, the weight of the tire has not been substantially increased and at the same time a substantially yieldable filler has been provided for the tire which is not subject to deflation when a foreign object has pierced the walls of the casing T. It will of course be understood that the cushion 10 may be pierced by nails or the like, but will not be collapsed.

It is, of course, understood that various changes and modifications may be made in the details of construction and design of the above specifically described embodiment of the invention without departing from the spirit thereof, such changes and modifications being restricted only by the scope of the following claims.

What is claimed is:—

1. A tire cushion insertable in a tire casing, comprising a resilient member adapted to substantially fill the cavity within a tire casing, said cushion being provided with a circular opening spaced inwardly from the outer walls thereof, and a plurality of openings spacedly mounted about said circular opening and open to the atmosphere at the inner periphery of the tire.

2. A tire cushion insertable in a tire casing, comprising a yieldable member adapted to be removably mounted in a tire casing, said member being provided with a circular opening therein, and a plurality of arcuately inclined spaced openings substantially surrounding said circular opening, said arcuate openings being positioned and spaced inwardly from the outer walls of the cushion and being open to the atmosphere at the inner periphery of the tire, and a plurality of resilient balls loosely mounted in said circular opening.

3. A tire cushion insertable in a tire casing, comprising a resilient member adapted to be removably mounted in a tire casing, said cushion having a substantially flat inner surface and being provided with a circular opening positioned and spaced inwardly from the outer walls of the cushion, and a plurality of spaced openings positioned about said circular opening and having the outlets thereof extending through said flattened surface of said cushion, and a plurality of resilient spheres loosely mounted in said circular opening.

4. A tire cushion insertable in a tire casing comprising a yieldable member having a circular opening therein spaced inwardly from the outer walls thereof, said cushion also being provided with a plurality of radially arranged openings, said openings being positioned about said circular opening and in spaced relation thereto, and a plurality of yieldable members mounted in said circular opening whereby to cooperate with the cushion to prevent collapsing of the cushion.

In testimony whereof I hereunto affix my signature.

HANS OMENITSCH.